United States Patent
Moseley et al.

[19]

[11] Patent Number: 6,007,260
[45] Date of Patent: Dec. 28, 1999

[54] FILM EXPOSURE STATUS INDICATOR FOR A FILM CARTRIDGE

[75] Inventors: Roy M. Moseley, Rochester; David J. Regan, Henrietta; Stanley Burke, Jr., Macedon, all of N.Y.

[73] Assignee: Eastman Kodak Company, Rochester, N.Y.

[21] Appl. No.: 08/740,346

[22] Filed: Nov. 7, 1996

[51] Int. Cl.$^6$ .................................................. G03B 17/26
[52] U.S. Cl. ............................................................ 396/515
[58] Field of Search .................................. 396/284, 285, 396/515

[56] References Cited

U.S. PATENT DOCUMENTS

| | | |
|---|---|---|
| 4,978,985 | 12/1990 | Smart et al. . |
| 5,153,627 | 10/1992 | Dwyer . |
| 5,278,600 | 1/1994 | Takashi et al. . |
| 5,475,454 | 12/1995 | Ezawa . |
| 5,715,494 | 2/1998 | Harris et al. ............................ 396/515 |

FOREIGN PATENT DOCUMENTS

0 431 529 B1  12/1995  European Pat. Off. .

*Primary Examiner*—Safet Metjahic
*Assistant Examiner*—Michael Dalakis
*Attorney, Agent, or Firm*—Roger A. Fields

[57] ABSTRACT

A film exposure status indicator 10,78 for a film cartridge 11 to indicate whether a filmstrip on a spool 18 within the cartridge has been at least partially rewound onto the spool. The indicator relies on rewinding motion of the spool to indicate at least partial exposure of the filmstrip. In the preferred embodiment 78, the status indicator is a self-contained module attachable to a standard 35 mm film cartridge entirely within an external well 66 of one 34 of the cartridge end caps. The module has a central aperture for receiving the protruding end 38 of the film spool and includes a cover disk 26 having first and second status indication windows 40,39. An indicator wheel 52 below the cover disk has first and second exposure indicia visible through the respective windows. A spring-biased locking button 58 on the indicator wheel 52 is engageable by a driver tab 50 on a driver wheel 42, rotatably driven by the film spool, below the indicator wheel when the driver wheel is rotated in the film-rewinding direction. When the locking button 58 is aligned with the first window 40, button 58 is urged axially to enter the window, indicating the filmstrip has been at least partially rewound, which movement locks the indicator wheel 52 to the cover disk 26 preventing further rotation of the indicator wheel and decouples the indicator wheel 52 from the driver wheel 42. A second indicium indicating film exposure is then visible through the second status indication window 39.

35 Claims, 6 Drawing Sheets

FILM EXPOSURE STATUS INDICATOR FOR A FILM CARTRIDGE

CROSS-REFERENCE TO RELATED APPLICATIONS

Reference is made to commonly assigned copending applications: Ser. No. 08/627,163 entitled Film Cartridge with Film Exposed Visual Indicator as filed Apr. 3, 1996 in the names of Clark E. Harris and Mark D. Fraser; issued as U.S. Pat. No. 5,715,494, Feb. 3, 1998; Ser. No. 08/629,699, entitled FILM CARTRIDGE WITH VISUAL FILM MOTION INDICATOR FOR VERIFYING FILM LOADING IN CAMERA and filed Apr. 9, 1996 in the names of Joseph A. Manico, Richard S. Keirsblick, John A. Agostinelli and Edgar G. Earnhart; issued as U.S. Pat. No. 5,623,325, Apr. 22, 1997; Ser. No. 08/586,520, entitled FILM CARTRIDGE WITH VISUAL INDICATOR FOR VERIFYING FILM LOADING IN CAMERA and filed Jan. 16, 1996 in the names of Madhav Mehra and Joseph A. Manico; issued as U.S. Pat. No. 5,587,756, Dec. 24, 1996; Ser. No. 08/584,480, entitled FILM CARTRIDGE WITH VISUAL INDICATOR FOR VERIFYING FILM LOADING IN CAMERA and filed Jan. 10, 1996 in the names of Joseph A. Manico and Dwight J. Petruchik; issued as U.S. Pat. No. 5,568,219, Oct. 22, 1996; and Ser. No. 08/449,032, entitled FILM SPOOL WITH BUILT-IN AUDIBLE INDICATOR FOR VERIFYING FILM LOADING IN CAMERA and filed May 24, 1995 in the name of Joseph A Manico. issued as U.S. Pat. No. 5,580,011, Dec. 3, 1996.

FIELD OF THE INVENTION

The invention relates generally to the field of photography, and in particular to a visual film exposure status indicator for a film cartridge.

BACKGROUND OF THE INVENTION

It is known for a film cartridge to have a film exposure status indicator for providing a visual indication of whether a filmstrip inside the cartridge housing has been exposed. Such indication is useful, for example, when a roll of film is exposed in a camera over several frames and then is partially rewound. When removed from a camera, such a roll may have the appearance of a completely unexposed roll, which can lead to inadvertent double exposure of frames and significant loss and inconvenience to the photographer.

Indication of exposure is readily achieved by indicating the direction of any rotation of a film spool subsequent to its assembly into a film cartridge. Such indication may take the form, for example, of changing the visual status of an indicator window when the spool completes at least one full revolution in the unwinding direction. This indication suffers in that simply loading a cartridge into a camera may require that sufficient film is pulled out of the cartridge to trip the exposed indicator. If the cartridge is then removed from the camera without being used, the indication of film exposure is erroneous. An alternative, and superior, strategy is to indicate that film has been exposed only when the spool has been rotated some amount in the rewind direction.

Prior art U.S. Pat. No. 5,278,600, issued Jan. 11, 1994, discloses a film cartridge comprising a film spool rotatable inside the cartridge housing, an indicator window in an end cap of the cartridge housing, an annular indicator wheel rotatable inside the cartridge housing behind the indicator window to move a film-exposed indication on the indicator wheel to the indication window, and an annular drive wheel rotatably linked with the film spool for rotating the indicator wheel to move the film-exposed indication to the indication window. A pin and receiver clutch device transmits movement of the drive wheel to the indicator wheel when the film spool is rotated in a film unwinding direction, and leaves the indicator wheel and the drive wheel disconnected when the film spool is rotated in a film rewinding direction. This apparatus has the double disadvantage of requiring a redesigned cartridge and of indicating exposure by spool rotation in the unwind direction.

Some other disclosures of exposure status indicators are found in U.S. Pat. Nos. 4,978,985, issued Dec. 18, 1990; 5,153,627, issued Oct. 6, 1992; 5,475,454, issued Dec. 12, 1995; and EPO Patent No. EP 0 431 529 B1, filed on Mar. 12, 1990. Each of these disclosed indicators requires at least a significant modification of the shell or end caps of a standard 35 mm film cartridge to provide an indicator window. In some cases, an entirely redesigned cartridge is required. None of them is useful in conjunction with a standard cartridge having no modification to its shell or end caps.

Thus a need exists for a film exposure status indicator which can be added to an unmodified cartridge or which requires modification of only the film spool and not of the cartridge shell or end caps, and which preferably can be constructed alternatively to be operable in the unwind or rewind direction, as desired by the manufacturer.

A further need exists for such an indicator which can be easily added to a standard film cartridge in a spooling and assembly line.

A further need exists for such an indicator which can be preassembled to a partially-formed cartridge in white lights prior to spooling and installation of a filmstrip into the cartridge in the dark, and particularly which can be preassembled as a self-contained film exposure status indicator module.

SUMMARY OF THE INVENTION

A film exposure status indicator axially mountable on and cooperative with a film spool extending through an end cap of a film cartridge for indicating the exposure status (nonexposed or exposed) of a photographic filmstrip in the cartridge, comprising an indicator window in a cover disk, an annular indicator wheel rotatable behind the indicator window to move a locking button into the indicator window, and an annular driver wheel coupled for rotation with the film spool for rotating the indicator wheel, is characterized in that:

the driver wheel has a spring-biased driver tab extending toward the indicator wheel for driveably engaging the indicator wheel in only one direction of rotation;

the locking button on the indicator wheel is spring-biased toward the cover disk; and the cover disk is rigidly attachable to the cartridge.

Preferably, the driver tab is engageable with the indicator wheel only while the filmstrip is being rewound into the cartridge, and a concentrically stepped reference disk is provided between the driver wheel and an end cap of the cartridge, and the cover disk is provided with a plurality of peripheral latches extending axially thereof, the latches being deformable to rigidly engage the periphery of the reference disk to form a film exposure status indicator module independent of the film cartridge.

DETAILED DESCRIPTION OF THE INVENTION

The invention is disclosed as being embodied preferably in a film cartridge. Because the features of a film cartridge are generally known, the description which follows is directed in particular only to those elements forming part of or cooperating directly with the disclosed embodiment. It is to be understood, however, that other elements may take various forms known to a person of ordinary skill in the art.

Figure 1:
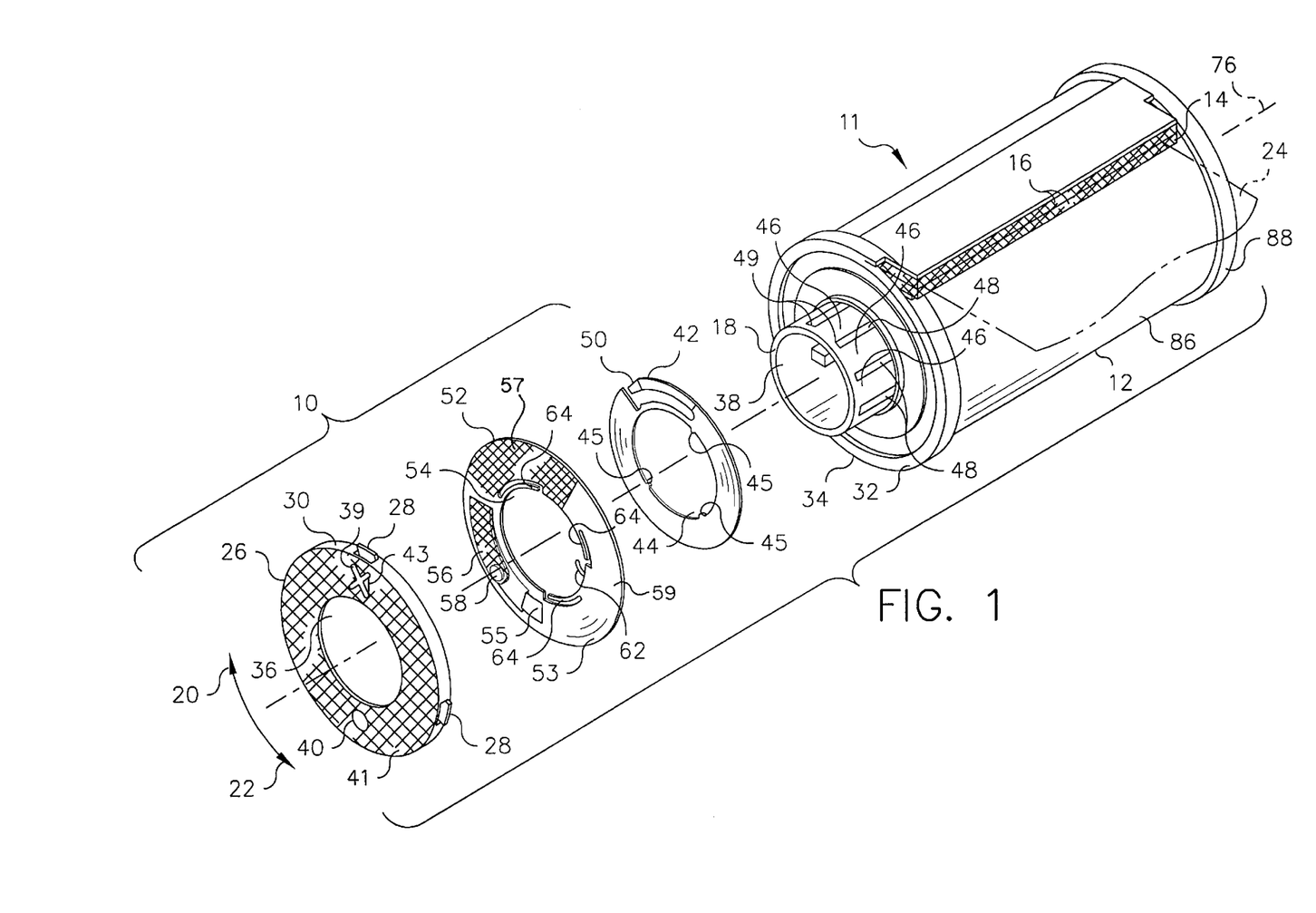
FIG. 1 is an exploded front isometric view of a film exposure status indicator in accordance with the invention, showing the relationship of the indicator components to a film cartridge.
Figure 2:
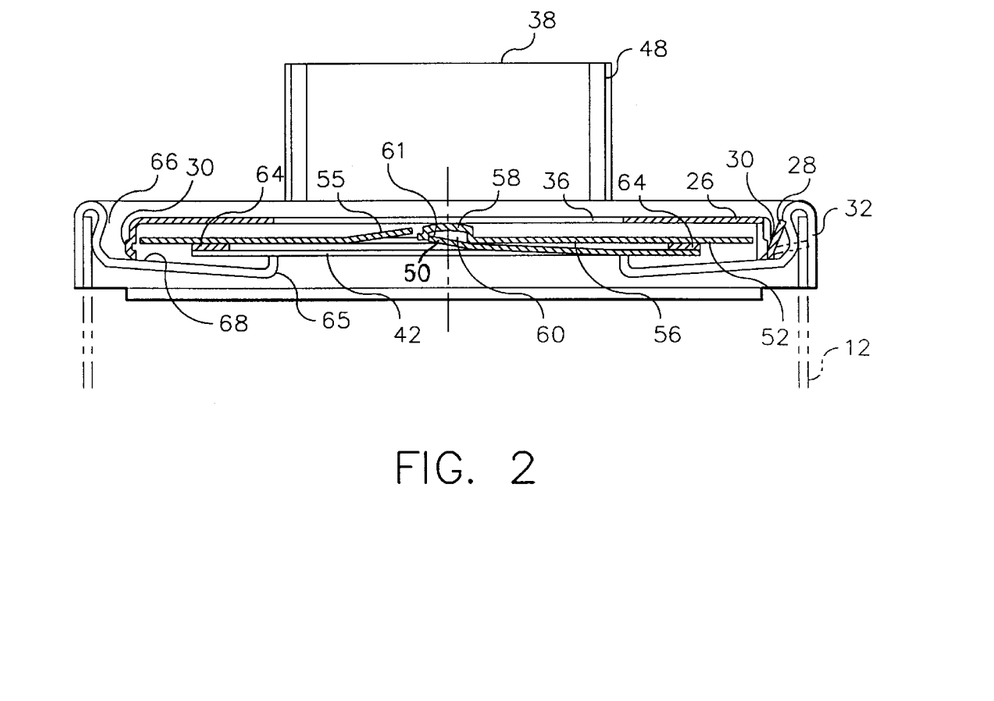
FIG. 2 is a cross-sectional view of the indicator of FIG. 1 after assembly with the film cartridge.

Referring now to the drawings, FIGS. 1 and 2 show a first embodiment of a film exposure status indicator 10 in accordance with the invention. A film cartridge 11 as is typical includes a cartridge housing 12 having a film egress/ingress slit 14 which is lined with a light-trapping plush 16. A film spool 18 is rotatably supported inside the cartridge housing 12 for rotation in film unwinding and film winding directions 20 and 22, respectively. A film roll, not shown, having a film leader 24 originally protruding from the slit 14 is coiled about the film spool 18.

A cover disk 26 has a plurality of peripheral latches 28, preferably three identical evenly-spaced latches, extending radially from a collar 30 on cover disk 26. Latches 28 engage with an annular crimped edge 32 of a first end cap 34 of cartridge 11 to secure the cover cap to the end cap. Preferably, the latches are mechanically staked at a plurality of points under edge 32, as shown in FIG. 2. Cover disk 26 has a central aperture 36 through which a protruding end portion 38 of film spool 18 extends, and it has a first indicator window or opening 40 which is preferably round. The diameter of the central aperture 36 is slightly greater than the diameter of the protruding end portion 38 of the film spool 18 to permit the protruding end portion to freely rotate within the center hole. In the preferred embodiment, cover disk 26 is further provided with a second indicator window or opening 39 which is preferably in the shape of an "X", this being an internationally-recognized symbol denoting "exposed." The upper surface 41 of cover disk 26 is preferably of a uniform finish, preferably black. A portion of the cover disk defining the X is preferably crimped slightly in the direction of the cartridge to form an anti-backup stop 43 for use as described hereinbelow.

An annular driver wheel 42 is located between the cover disk 26 and the end cap 34, within the three snap latches 28 of the cover disk and the annular crimped edge 32 of the end cap. Driver wheel 42 has a central aperture 44 with a plurality of inwardly-extending teeth 45, preferably pointed and preferably three in number, which rotatably engage and couple with the end portion 38 of spool 18. The teeth 45 may engage the spool by being embedded therein, when the indicator is used with a standard smooth-surface film spool, or preferably, the spool is castellated or splined and the teeth are disposed in the grooves 46 between a plurality of lands 48, the teeth being engaged by lands when the spool is rotated to rotate the driver wheel 42 in either the unwinding or the winding direction. Preferably, the spool is provided with nine lands equally spaced 40° apart to engage the three teeth equally spaced 120° apart. Preferably, the grooves 46 represent a reduction in spool diameter from a standard spool and the outer surfaces of the lands 48 define a cylinder having the same diameter as the outer surface of a standard unfeatured spool. Fluting of the spool is the only modification of a standard film cassette required by the preferred embodiment of the invention.

Driver wheel 42 is further provided with a peripheral, arcuate portion defining a spring-biased driver tab 50 extending toward the cover disk from the plane of the driver wheel.

An annular indicator wheel 52 is located between the driver wheel 42 and the cover disk 26, within the three snap latches 28 of the cover disk and the annular crimped edge 32 of the end cap. Indicator wheel 52 has a central aperture 54 whose diameter is greater than the diameter of the protruding end portion 38 of spool 18. This permits the lands 48 of end portion 38 to extend through the central aperture 54 without touching indicator wheel 52.

Indicator wheel 52 is provided with an arcuate portion defining a leaf spring 56 tethered at one end to wheel 52 and extending axially of the wheel toward the cover disk 26 and supporting at its free end a locking button 58 having a detent 60 on an underside thereof. Detent 60 is preferably of a "D" shape, having a flat face 61 extending generally radially of wheel 52 for receiving firmly and reliably the end of driver tab 50 during a portion of the operation of the status indicator as described hereinbelow. The upper surface 53 of indicator wheel 52 is provided over different portions thereof with a plurality of contrasting exposure-indicative indicia. Preferably, surface 53 is half black and half white, defining first and second film exposure indicia 57,59, respectively, the locking button 58 preferably being black.

Indicator wheel 52 is further provided with a plurality, preferably three, of arcuate portions along its inner periphery 62 defining leaf springs 64 extending toward driver wheel 42 for urging driver wheel 42 against an axially-extending cylindrical flange 65 of end cap 34 as a first reference surface and for axially positioning the indicator wheel with respect to the driver wheel during assembly.

The assembled film exposure status indicator 10 is shown in composite cross-section in its non-exposed-indicating state in FIG. 2. The upper surface 41 of cover disk 26 is below the plane of edge 32. The entire status indicator is thus disposed within "free" space within the international design standard for a 35 mm cartridge. The assembly is held within the well 66 in end cap 34 by latches 28 which are snapped and preferably staked under the crimped edge 32 of the end cap. The collar 30 on cover disk 26 bears on the upper surface 68 of end cap 34 as a reference for cover disk 26. Locking button 58 is spring biased by spring 56 against the underside of cover disk 26. The first and second exposure indicia 57,59 as seen through the first and second indicator windows show black through the X-window 39 and white through the O-window 40. Since the surface 41 of cover disk 26 is black, only the white O-window is visible, indicating that the filmstrip has not been unwound. Of course, first and second indicia 57,59 may be provided as white and black, respectively, and the surface 41 of cover disk 26 provided as white, with equal operability of the invention. Obviously, other contrasting color options are also equally suitable.

Preferably, all components are formed from tin-free steel sheet stock about 0.008-inch in thickness. Other metals or plastics may be suitable for particular applications.

In assembling the status indicator 10, proper orientation of the locking button 58 and the cover disk 26 is important. The locking button 58 must be located between the O-window 40 and the X-window 39 in the unwind direction 20, as shown in FIG. 1, so that, in the event that the indicator wheel 52 is inadvertently rotated clockwise by frictional contact with the driver wheel 42 during unwinding of the filmstrip, the locking button 58 will be arrested by anti-backup stop 43 before the locking button 58 reaches the O-window 40.

In operation, during unwinding of the filmstrip from spool 18 (spool rotation clock-wise as shown in FIG. 1) driver wheel 42 is rotated with spool 18 past end cap 34. The indicia as seen through the windows do not change in appearance. During rewinding of the filmstrip onto the spool, driver wheel 42 is rotated with the spool past the end cap 34 and the indicator wheel 52 until the spring-biased driver tab 50 can pivot upwards into detent 60 and engage face 61, rotationally coupling driver wheel 42 to indicator wheel 52 in the rewinding direction. This is the point in the operational sequence shown in FIG. 2. Further rewinding of the spool, driver wheel, and coupled indicator wheel through a partial revolution brings locking button 58 into axial alignment with first indicator window 40. Button 58 is sized to fit into window 40, and it is so urged by spring 56. When the locking button 58 enters the window 40, it simultaneously a) positively couples the indicator wheel 52 to the cover disk 26 and b) raises the detent 60 from the driver tab 50, positively decoupling the driver wheel 42 from the indicator wheel 52, and c) provides indication in the O-window that the cartridge is no longer in a new or unwinding state (color of the locking button, preferably black, matches the color of the upper surface of the cover disk, also preferably black). The driver tab 50 disengages from the detent because the length of stroke of the tab in a relaxed state of tab spring 50 is sufficient to engage the driver tab in the detent 60 only when the locking button 58 is not in the indicator window 40 and is insufficient to engage the driver tab in the detent when the locking button is in the indicator window. The driver wheel 42 continues to rotate as the spool rewinds the filmstrip further. Upon disengaging from the detent 60, the driver tab 50 encounters ramp 55 on the indicator wheel and is thereby led back under the indicator wheel 52 on each successive revolution of the driver wheel 42. Simultaneously with the entry of the locking button into the O-window, the white portion of the indicator wheel becomes visible behind the X-window, providing positive indication that the film cartridge has been at least partially rewound. Of course, it should be understood that incorporation of the X-window feature in the preferred embodiment is only a feature of that embodiment and is not an essential element of other embodiments in accordance with the invention.

The embodiments herein described are useful for indicating when a film cartridge has been partially rewound. Fully within the scope of the invention are other embodiments which can be constructed, as desired, for indicating when a film cartridge has been partially unwound, simply by reversing the rotational orientation of the locking tab, detente, spring, and driver tab to be operational in the unwind direction. Such embodiments may not be as desirable, however, for the reasons described hereinabove.

Figure 3:
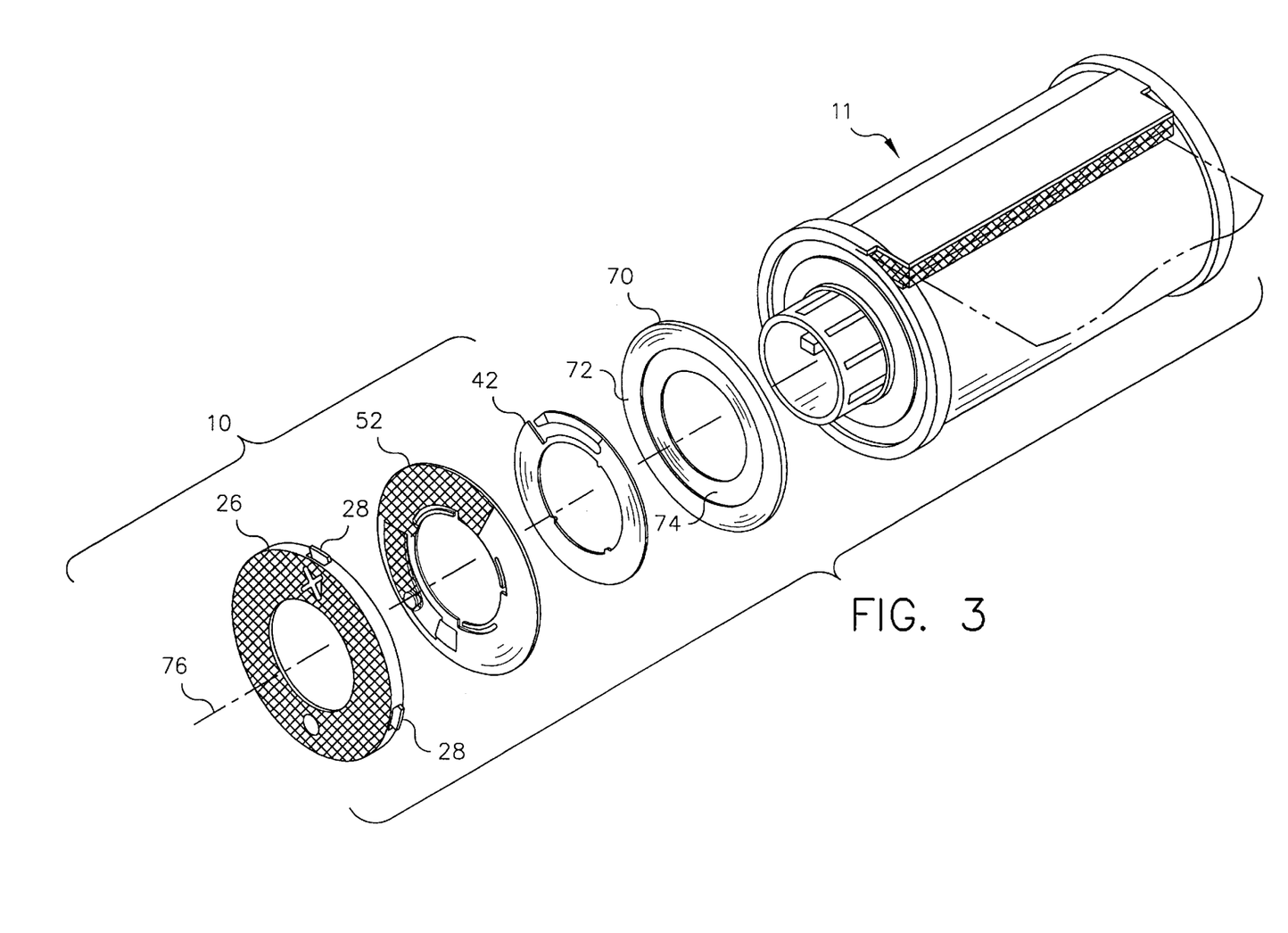
FIG. 3 is an exploded front isometric view of another film exposure status indicator similar to the indicator of FIG. 1, showing the addition of a back cover reference plate.
Figure 4:
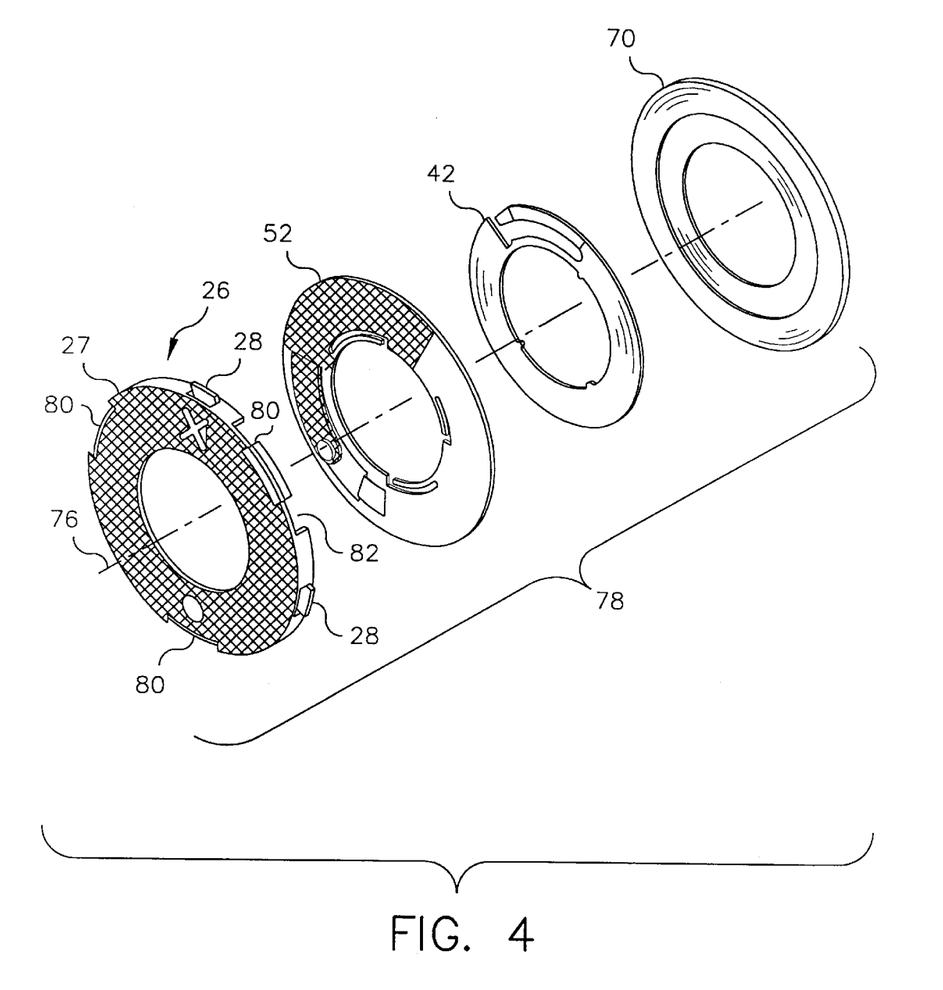
FIG. 4 is an exploded front isometric view of a self-contained film exposure status indicator module, showing the cover disk provided with assembly latches.
Figure 5:
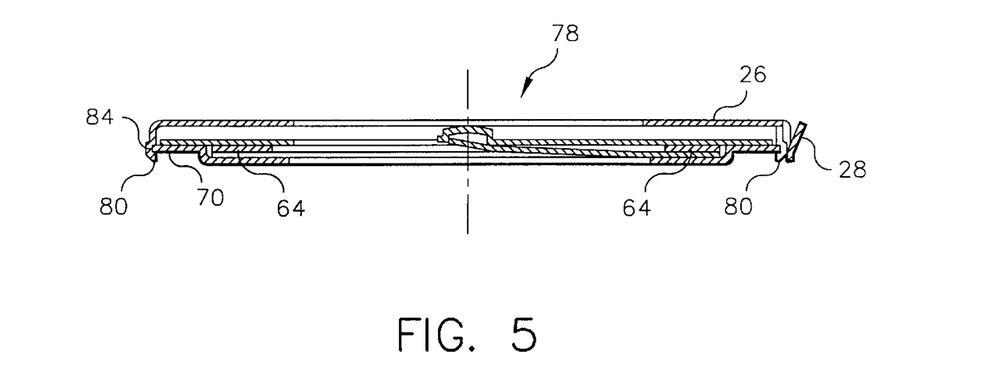
FIG. 5 is a composite cross-sectional view of the self-contained indicator module shown in FIG. 4.
Figure 6:
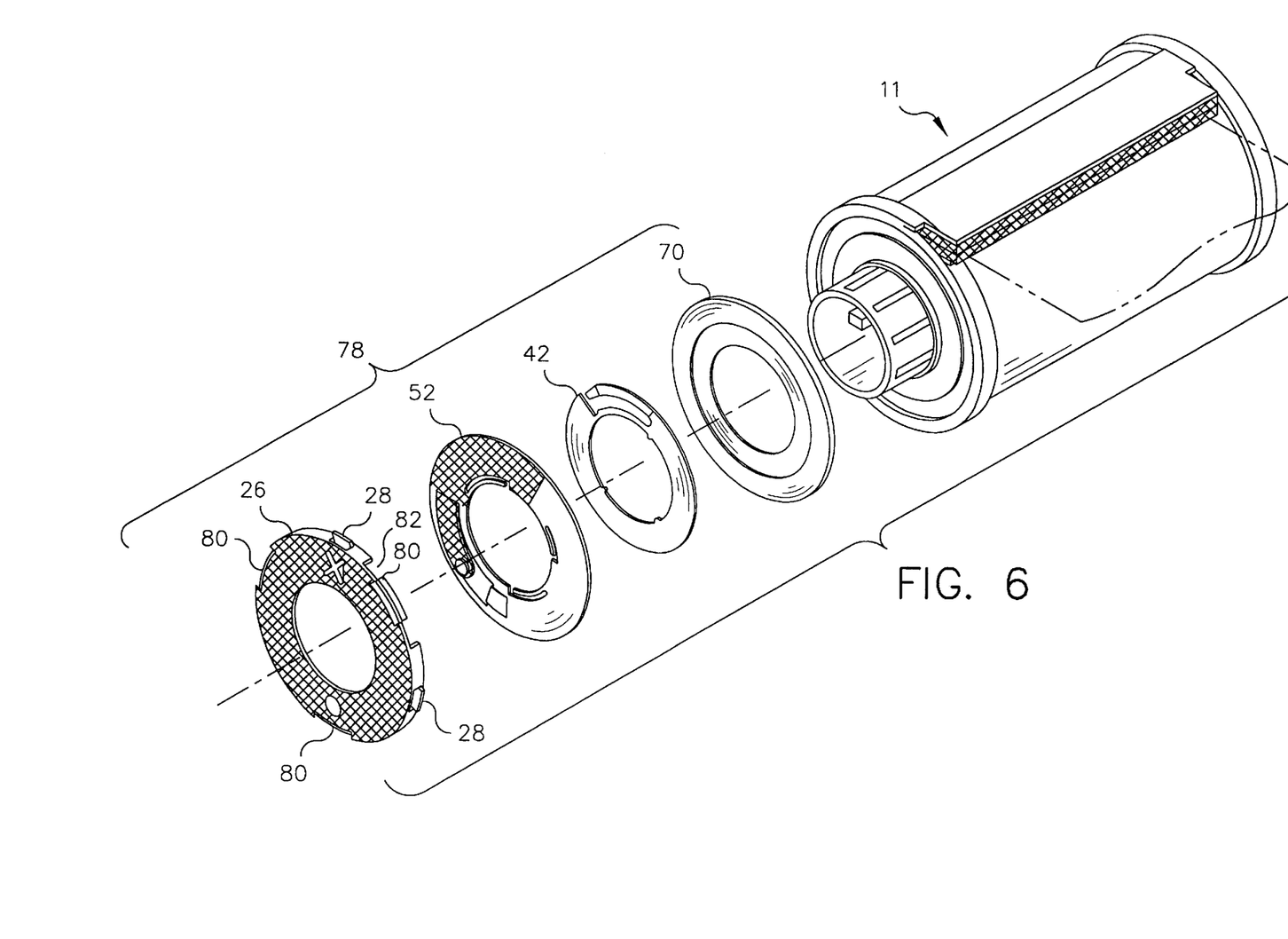
FIG. 6 is an exploded front isometric view of the self-contained indicator module shown in FIGS. 4 and 5, showing the relationship of the module to a film cartridge.
Figure 7:
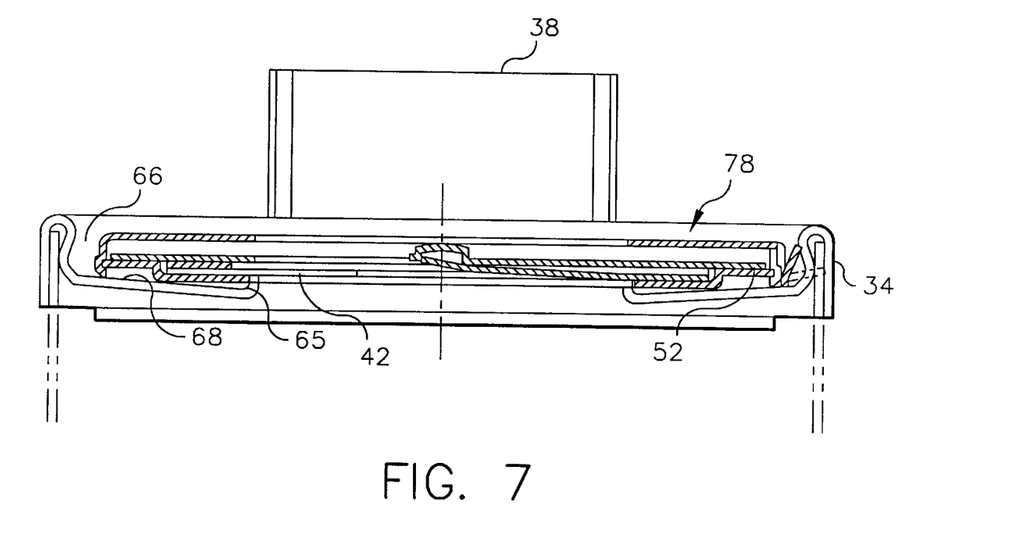
FIG. 7 is a cross-sectional view of the indicator module shown in FIG. 6 after assembly with the film cartridge.

In some applications, the reference surfaces provided by flange 65 and surface 68 may be unsuitable, and it may be desirable to include in a film exposure status indicator a planar reference surface such as stepped reference disk 70, as shown in FIG. 3. Disk 70 presents first and second smooth, annular, planar surfaces 72 and 74, orthogonal to the cartridge axis 76, for support of indicator wheel 52 and driver wheel 42, respectively.

Incorporation of a multiple-component exposure status indicator as described above into a film cartridge manufacturing line can be difficult and expensive. The indicator cannot be assembled onto the spool until the spool has been wound with film and inserted into the cartridge shell. Modern manufacturing lines typically complete the assembly, labelling, and packaging of cartridges in a single continuous operation, typically under no-light conditions. Insertion of the individual-component status indicator into such a line can require substantial retooling expense.

The status indicator components shown in FIG. 3 can be assembled into a self-contained module 78 as shown in FIGS. 4–7 by the simple addition of a plurality of module snap latches 80 to the cover disk 26. Preferably, the periphery 27 of the cover disk is radially relieved over portions 82 to provide a radius to the snap latches 80 smaller than the radius to the locking latches 28 which are still required to attach the module to the film cartridge. The snap latches 80 are provided with a groove 84 for capturing the edge of the reference disk 70 as a back cover for the module, the groove being spaced axially from the cover disk by an appropriate distance to provide the proper internal spacings above and below the indicator wheel 52.

Figure 8:
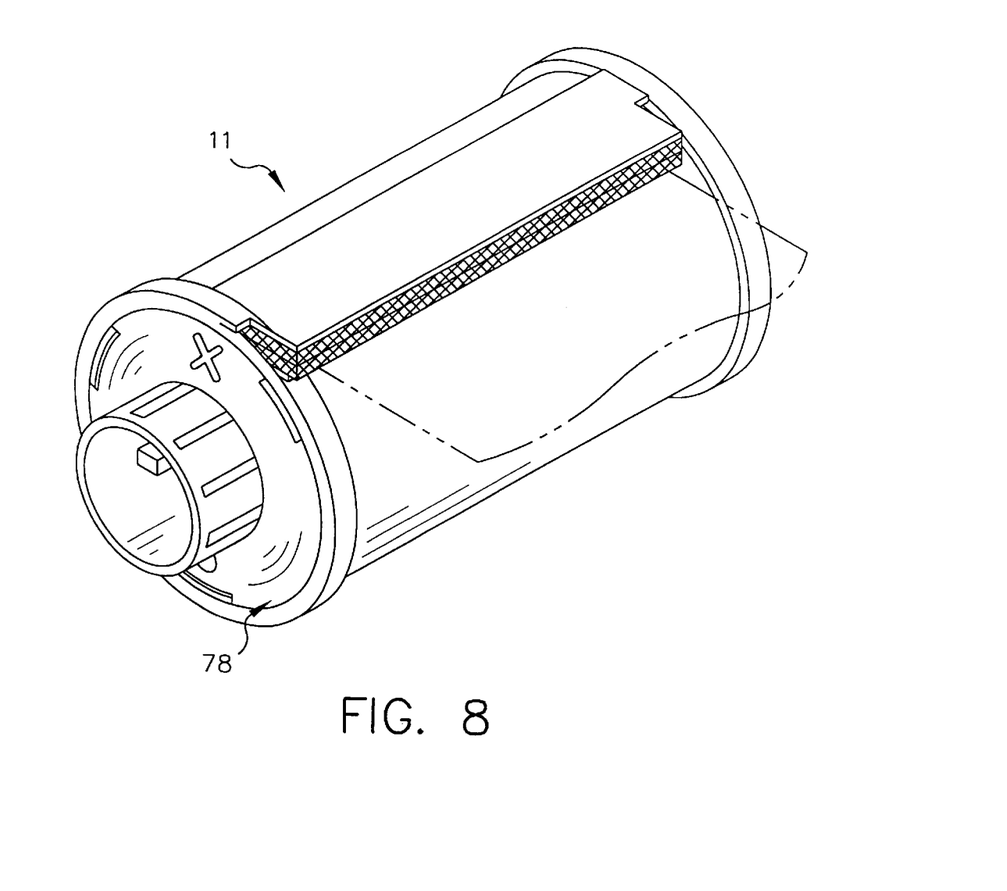
FIG. 8 is an isometric view of an indicator in accordance with the invention assembled to a film cartridge.

A great benefit of a self-contained modular embodiment in accordance with the invention is that it may be installed on a first end cap of a partially formed cartridge in white light before the dark-requiring film insertion operations. The module may be assembled off-line ahead of time, and also the cartridge may be partially pre-assembled. The cartridge shell 86 having plush 16 for the exit slit 14 already applied is rolled and first end cap 34 is installed and crimped onto the shell. Then the indicator module 78 is installed in the well 66 of the end cap and fastened therein as by staking of the latches 28, readying the partial-cartridge for insertion of the filmstrip wound on a film spool. To avoid having the teeth 45 in the driver wheel collide with the preferably beveled outer ends 49 of the lands 48 during insertion of the spool through the module, a longitudinally-grooved tapered mandrel (not shown) is rotatably inserted through the module and end cap to acquire and rotationally orient the teeth 45 and the end 38 of the spool. As the mandrel is withdrawn, the spool is drawn through the end cap and module without interference of the teeth and lands. A second end cap 88 is installed over the opposite end of the film spool and is crimped onto the opposite edge of the cartridge shell to complete the assembly. The finished cartridge 11 having an integral film exposure status indicator 10 is shown in FIG. 8.

The invention has been described with reference to a preferred embodiment. However, it will be appreciated that variations and modifications can be effected by a person of ordinary skill in the art without departing from the scope of the invention.

What is claimed is:

1. A film exposure status indicator axially mountable on and cooperative with a film spool, which spool extends through an end cap of a film cartridge, for indicating the exposure status (nonexposed or exposed) of a photographic filmstrip in the cartridge, comprising first and second indicator windows in a cover disk wherein one of said indicator windows is indicative of non-exposure and the other is indicative of exposure, an annular indicator wheel rotatable behind said indicator windows to move a locking button into one of said indicator windows, said indicator wheel having first and second film exposure indicia on a surface thereof, and an annular driver wheel coupled for rotation with said film spool for rotating said indicator wheel, being characterized in that:

said driver wheel has a spring-biased driver tab extending toward said indicator wheel for driveably engaging said indicator wheel in only one direction of rotation;

said locking button on said indicator wheel is spring-biased toward said cover disk; and said cover disk is attachable to said cartridge.

2. A status indicator as recited in claim 1 wherein said driver tab is engageable with said indicator wheel only while said filmstrip is being rewound into said cartridge.

3. A status indicator as recited in claim 1 wherein said driver tab is engageable with said indicator wheel only while said filmstrip is being unwound from said cartridge.

4. A status indicator as recited in claim 1 wherein the presence of said locking button in one of said indicator windows indicates visually that said filmstrip has been at least partially rewound into said cartridge.

5. A status indicator as recited in claim 1 wherein the movement of said locking button on said indicator wheel to lock with said cover disk is in a direction parallel to the longitudinal axis of said cartridge.

6. A status indicator as recited in claim 1 wherein said locking button is formed in a leaf spring, both button and spring being formed in said indicator disk.

7. A status indicator as recited in claim 1 wherein a detent on the underside of said locking button is engageable by said driver tab only when said locking button is not in one of said windows.

8. A status indicator as recited in claim 7 wherein placement of said locking button in one of said indicator windows positively couples said indicator disk to said cover disk and positively decouples said indicator disk from said driver disk by disengagement of said driver tab from said detent to prevent further rotation of said indicator disk.

9. A status indicator as recited in claim 8 wherein said driver tab is formed from said driver wheel to define a leaf spring tethered at a first end thereof to said driver wheel and terminating at a second end thereof to define said driver tab and having a stroke of action, and wherein the length of said stroke of said spring is sufficient to engage said driver tab in said detent when said locking button is not in one of said indicator windows and is insufficient to engage said driver tab in said detent when said locking button is in one of said indicator windows.

10. A status indicator as recited in claim 8 wherein said indicator disk includes a ramp formed in said disk for redirecting said driver tab beneath said indicator disk after said tab is disengaged from said detent.

11. A status indicator as recited in claim 1 wherein said locking button bears said first film-exposure indicium.

12. A status indicator as recited in claim 1 wherein the presence of said locking button in one of said indicator windows indicates visually that said filmstrip has been at least partially unwound from said cartridge.

13. A status indicator as recited in claim 1 wherein said cover disk is provided with means for attachment to said film cartridge.

14. A status indicator as recited in claim 13 wherein said means includes a plurality of latches extending outwardly of said disk for attachment to the end cap of said cartridge.

15. A status indicator as recited in claim 1 further comprising a concentrically stepped reference disk between said driver wheel and an end cap of said cartridge.

16. A status indicator as recited in claim 15 wherein said driver wheel is disposed within an inner step of said reference disk and is referenced against the upper surface thereof, and wherein said indicator wheel is disposed and referenced against the upper surface of an outer portion thereof, the height of said step defining the axial separation of said driver wheel from said indicator wheel.

17. A status indicator as recited in claim 16 wherein said indicator wheel is provided with a plurality of spring elements operative against said driver wheel to urge said driver wheel against said reference disk.

18. A status indicator as recited in claim 1 wherein said driver disk is provided with at least one tooth extending inwardly of a central aperture therein for engaging said film spool.

19. A status indicator as recited in claim 1 wherein said driver disk is provided with a plurality of spaced-apart teeth extending inwardly of a central aperture therein for engaging with a plurality of splines in the surface of said film spool.

20. A status indicator as recited in claim 19 wherein the lands between said splines on said film spool are beveled at the outer ends thereof to facilitate insertion of said spool through said central aperture in said driver disk.

21. A status indicator as recited in claim 19 wherein said cover disk is provided with a plurality of snap latches extending axially thereof, said snap latches being deformable to rigidly engage the periphery of said reference disk to form an exposure-indicating module assemblable as a unit independent of said film cartridge.

22. A status indicator as recited in claim 21 wherein the thickness of said module is less than the height of the rim of said end cap of said film cartridge.

23. A status indicator as recited in claim 1 wherein the finish of the upper surface of said cover disk matches the finish of one of said first and second exposure indicia on said indicator wheel.

24. A status indicator as recited in claim 1 wherein the placement of said first and second film exposure indicia on said indicator wheel is such that said first indicium is visible through said second window and said second indicium is visible through said first window when said filmstrip has not been at least partially rewound into said cartridge, and that said first indicium is visible through said first window and said second indicium is visible through said second window when said filmstrip has been at least partially rewound into said cartridge.

25. A status indicator as recited in claim 1 wherein the placement of said first and second film exposure indicia on said indicator wheel is such that said first indicium is visible through said second window and said second indicium is visible through said first window when said filmstrip has been at least partially rewound into said cartridge, and that said first indicium is visible through said first window and said second indicium is visible through said second window when said filmstrip has not been at least partially rewound into said cartridge.

26. A status indicator as recited in claim 1 wherein said first indicium and said finish of said cover disk are black, and said second indicium is white.

27. A status indicator as recited in claim 1 wherein said first indicium and said finish of said cover disk are white, and said second indicium is black.

28. A status indicator as recited in claim 1 wherein said first indicator window is round and said second indicator window is X-shaped.

29. A status indicator as recited in claim 28 wherein a portion of said cover disk forming said X-shaped window is angled toward said indicator disk to interfere with and prevent rotation of said locking button past said portion while said filmstrip is being unwound from said cartridge.

30. A film cartridge having an exposure status indicator axially mounted on and cooperative with a film spool, which spool extends from an end cap of the film cartridge, for indicating the exposure status (nonexposed or exposed) of a photographic filmstrip in the cartridge, comprising a film spool, first and second indicator windows in a cover disk wherein one of said indicator windows is indicative of non-exposure and the other is indicative of exposure, an annular indicator wheel rotatable behind said indicator windows to move a locking button into one of said indicator windows, said indicator wheel having first and second film-exposure indicia on a surface thereof, and an annular driver wheel coupled for rotation with said film spool for rotating said indicator wheel, being characterized in that:

said driver wheel has a spring-biased driver tab extending toward said indicator wheel for driveably engaging said indicator wheel in only one direction of rotation;

said locking button on said indicator wheel is spring-biased toward said cover disk; and said cover disk is attached to said cartridge.

31. A film exposure status indicator comprising a plurality of wheels disposable as a drive train when a film in a film cartridge is rewound, at least one of said wheels being engageable with a film spool of said cartridge, said indicator having a cover disk which encloses said wheels and defines therewith a module which is assemblable to said cartridge, said cover disk having a plurality of film-exposure status windows.

32. The status indicator as recited in claim 31 wherein an end of said spool on which said wheels are rotatably mounted is located at an end of said cartridge.

33. The status indicator as recited in claim 31 wherein said status windows are visible when the end of said cartridge is viewed.

34. The status indicator as recited in claim 32 wherein said cartridge is provided with a well for receiving said module, said well being concentric with and open at said end of said cartridge.

35. The status indicator as recited in claim 34 wherein said well has a rim and said cover disk has latches which engage said rim to hold said module in said well.

* * * * *